Dec. 24, 1968 J. J. DANCSIK 3,417,661
THREE DIMENSIONAL MILLING MACHINE WITH PANTOGRAPH CONTROL
Filed Sept. 8, 1966 3 Sheets-Sheet 1

INVENTOR.
JOSEPH J. DANCSIK
BY
ATTORNEY

Dec. 24, 1968   J. J. DANCSIK   3,417,661
THREE DIMENSIONAL MILLING MACHINE WITH PANTOGRAPH CONTROL
Filed Sept. 8, 1966   3 Sheets-Sheet 2

INVENTOR.
JOSEPH J. DANCSIK
BY
ATTORNEY

Dec. 24, 1968    J. J. DANCSIK    3,417,661
THREE DIMENSIONAL MILLING MACHINE WITH PANTOGRAPH CONTROL
Filed Sept. 8, 1966    3 Sheets-Sheet 3

INVENTOR.
JOSEPH J. DANCSIK
BY Benjamin Neuman
ATTORNEY

3,417,661
THREE DIMENSIONAL MILLING MACHINE WITH PANTOGRAPH CONTROL
Joseph J. Dancsik, 23550 Oneida,
Oak Park, Mich. 48237
Filed Sept. 8, 1966, Ser. No. 578,039
14 Claims. (Cl. 90—13.1)

ABSTRACT OF THE DISCLOSURE

The invention involves a three-dimensional milling machine device with a pantograph control having the capability of machining in three dimensions over an area defined by a substantially rectilinear perimeter, having adjustable features permitting shift of the machining cutter over such area without change of the workpiece position, and further having a vertically slidable unitary motor-driven cutter and tracer structure in balanced relationship to and upon a supporting cross-slide arm member in the device.

---

This invention relates to a three dimensional milling machine with pantograph control, and more particularly to such a three-dimensional device having an adjustable, expansible feature whereby the device can operate in any one of a number of machines and especially in machines which are designed to produce large plastic-forming, die cast or forging dies and tools as well as smaller dies and tools.

The invention involves a device which is preferably but not exclusively usable as an accessory readily mountable upon a machine tool support member, such as an over-arm, vertical post or slide, or other suitable machine support member which is either movable or nonmovable. The device comprises a support plate structure adapted to be mounted upon a machine tool support member, a pair of spaced apart arms slidingly mounted for movement to-and-fro of a table adapted to hold a master model and a work piece, a tie bar or front rail member fixedly secured to the arms and at right angles thereto for mounting a cross slide member movable in a direction transversely of the direction of travel of the spaced apart arms, an adjustably positioned beam or support member for a vertically slidable unitary motor-driven cutter and tracer structure mounted upon a dovetail structure pivotally mounted on the last-mentioned support member and upon the support plate structure for vertical movement of the cutter and the tracer.

The machine of this invention is particularly suitable for two or three dimensional machining of contoured dies and tools with fine finishing of the surfaces.

The inventive construction has many advantages. The cross slide member moves a distance defined only by the limits of the cross slide supporting member or tie bar. The cutting tool spindle and tracer are in a constant non-varying relationship. Because of the substantial travel and adjustability provided by the instant construction, the set up for the work piece can remain fixed and stationary. The cutting and tracing outline is rectangular, and the cutter travels fully within the perimeter of such rectangular area. The structure permits use of the device on a very large machine such as a horizontal milling machine or large planer, as well as on a small mill or similar machine, because the device can be compactly arranged as well as enlarged. The level of the cutter is common for to-and-fro and for lateral or cross movements, the device being maintained in balance at all times. The construction is very strong and very accurate, permitting a balanced control of the cutting tool and tracer at all times.

Means for balancing the device is self-contained and provides control of vertical movement only, simultaneously balancing the vertical travel of the cutting tool spindle, the tracer and the pantograph beam structure. The motor pulley and spindle pulley are always on the same plane, regardless of the posture or position of the device, because the motor mount and the spindle mount are a common unit. For this reason, a heavy duty motor and a timing type drive belt can be used to produce cutter spindle speeds from very low r.p.m.'s to more than 20,000 r.p.m. The principal advantage in using such timing type belt is to avoid slipping and stretching, two defects commonly encountered when round drive belts are used.

The instant inventive device can cut a 2- or 3-dimensional form and is manually controlled from a single point. If desired, hydraulic drives can be incorporated to produce travel of the cutting tool and tracer in each of two directions as may be required.

The machine has been particularly designed for operation on a 1 to 1 ratio between model and workpiece, but it can also be arranged for operation on a 1½:1 and up to an 8:1 ratio, by a simple and conventionally known adjustment of the pantograph beam structure. The device can operate with a small master and a large work piece, or in the opposite proportions.

It can finish machine large size plastic forming dies, die cast dies, forging dies and similar devices, or it can machine the tiniest dies and tools.

The instant machining device is a complete unit, all parts including the balancing components being self-contained. Therefore, it is adaptable for use on practically any machine tool. It is mountable with a few screws to such machine and is ready for operation. Or, optionally, it can be embodied into and built directly as an integral part of a machine tool.

Heretofore, metal cutting machines with pantograph control devices have been designed for and built into particular machines, and their limits of functional performance have therefore been the limits imposed by the machine. The concept of the instant invention is that such device have its own limits, that it be primarily an accessory usable on any type and size machine tool, that it be three-dimensional and adjustable for enlargement or contraction in each of three principal dimensions, and that it be relatively simple in construction, precise in function and easy for operators to use efficiently.

It is an object of the invention to provide a three-dimensional milling machine with pantograph control device as an accessory for a machine tool, and which provides right angle movements for a cutting tool in three planes. Another object is the provision of a simple support plate structure for such accessory device so as to permit its use on any suitable machine tool. A further object is to provide such a device producing a rectilinear operative cutting outline in horizontal plan. Yet another object is to provide means in such device for adjustably shifting the operative cutting perimeter of the cutting tool. A further object is to produce such device in a simple, compact, efficient structure, having substantially no maintenance problems and capable of precision operation.

These and additional objects of the invention and features of construction will become more clearly apparent from the description of an illustrated example of such device given below, in which the terms employed are used for purposes of description and not of limitation. Reference is here made to the drawings annexed hereto and made an integral part of this specification, in which.

Figure 1:
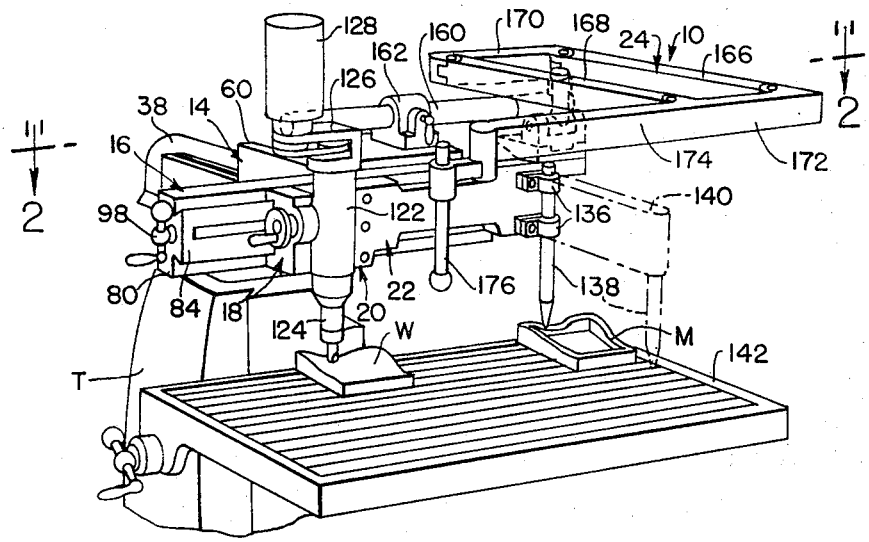
FIGURE 1 is a perspective view of an exemplary machine with pantograph control embodying the inventive construction.

An example of a three dimensional milling machine with pantograph control embodying the inventive concept is that illustrated in the drawings and described hereinbelow. This machine device 10 comprises a support plate structure 12, a to-and-fro slide structure 14 for movement of the cutter and tracer in a direction forwardly and rearwardly of the work piece and model, a lateral or cross slide structure 16 for movement of the cutter and tracer in a direction at right angles to the preceding direction, a cutting tool spindle and tracer support structure 18 arranged for adjustable movement upon and connected to the cross slide structure 16 and having a slide way structure 20 for vertical travel of a cutting tool spindle and tracer arm structure 22, a pantograph beam structure 24 pivotally mounted upon the support plate structure 12 and pivotally connected to the vertical slidable arm structure 22, and a vertical travel counter-balancing mechanism 26.

The support plate structure 12 comprises a mounting member 30 having a wall 32 counterbored to receive a support plug 34 secured in the complementary counterbore of a wall 36 of a machine tool support 38. The member 30 is secured in fixed position upon the support 38 by screws 40 passed through the wall 32 and threadedly attached in the wall 36. The support plate structure 12 is provided adjacent its lateral sides 42, 42 with an upper and lower circulating guide ball race or slide way 44, 44 for ball bearings 46 which are spaced apart by relatively resilient pads 48 of a diameter slightly less than the diameter of the balls. The pads 48 are relatively thin and may be made of rubber, nylon or other similar materials.

The to-and-fro slide structure 14 comprises a pair of parallel spaced apart arms 60, each having top and bottom ball bearing slide ways 62, 62 for the balls 46 of the support plate structure 12, and a tie bar or front beam 64 fixedly secured to the forward ends of the arms 60 and at right angles thereto. The tie bar is also provided with ball bearing slide ways 66, 66 extending longitudinally along its top and bottom edges for balls 68 rotatable in a cage 70.

The lateral or cross slide structure 16 comprises a slide member 80 slidingly movable on the tie bar ball bearings 68 and having upper and lower ball slideways 82, 82 and provided at its forward face with a dovetail tenon 84. Slide member 80 moves or slides laterally on the tie bar 64 to the left or right and at right angles to the direction of travel of the arms 60.

The cutting tool spindle and tracer support structure 18 is adjustably movable upon the slide member 80 and comprises slide way structure 20 having a mortised groove 92 complementary to the dovetail tenon 84 of the member 80. The slide member 80 is provided with a groove or slot 94 in which a screw 96 is disposed for rotation by operation of a hand crank 98 disposed at one end of the member 80. The screw 96 is threaded through a nut portion 100 of the slide body 102 for advancing or retracting the slide way structure 20 and its supported arm 22.

The slide way structure 20 comprises the body 102 having the nut portion 100 extending into the groove or slot 94, the ball guides 104, 104 and the spindle travel adjusting mechanism 106 which comprises a screw 108 and an adjusting wheel 110 having a gear operatively associated with a gear on the screw, supported in a mount 112. An adjustable vertical stop 114 is threadedly advanced or retracted on the screw 108 to limit downward travel of the spindle.

Figure 4:
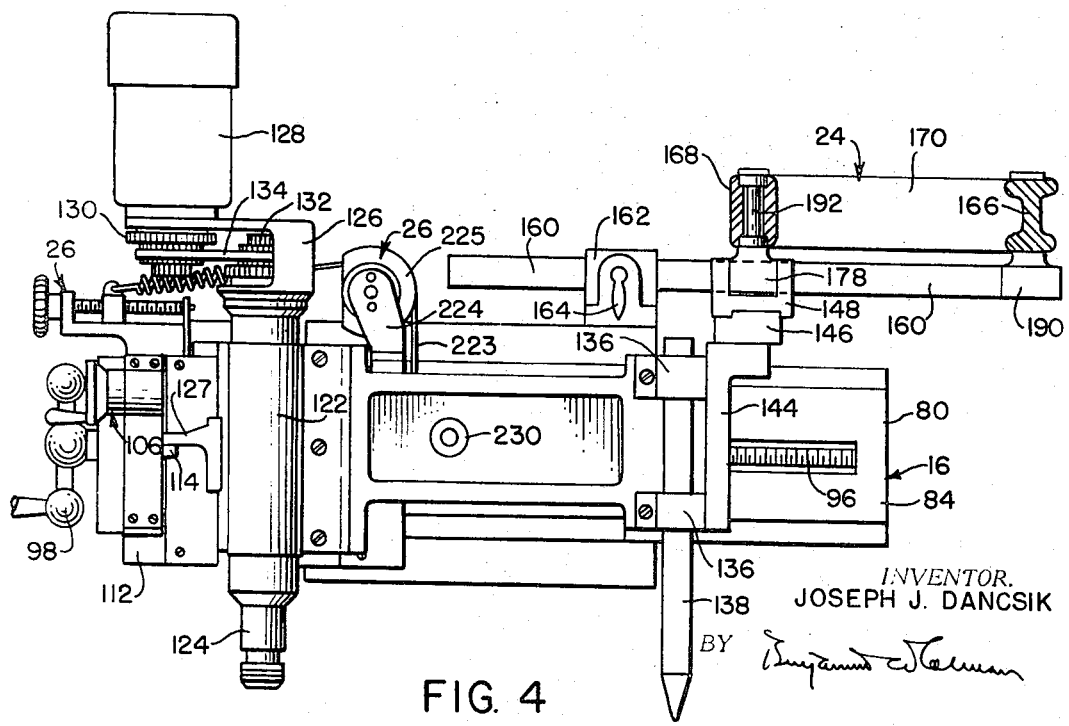
FIGURE 4 is a front elevational view of the device of FIGURE 1 with the cutting tool and tracer mounting support member adjustably moved to an extreme left position on its dovetail mount.
Figure 5:
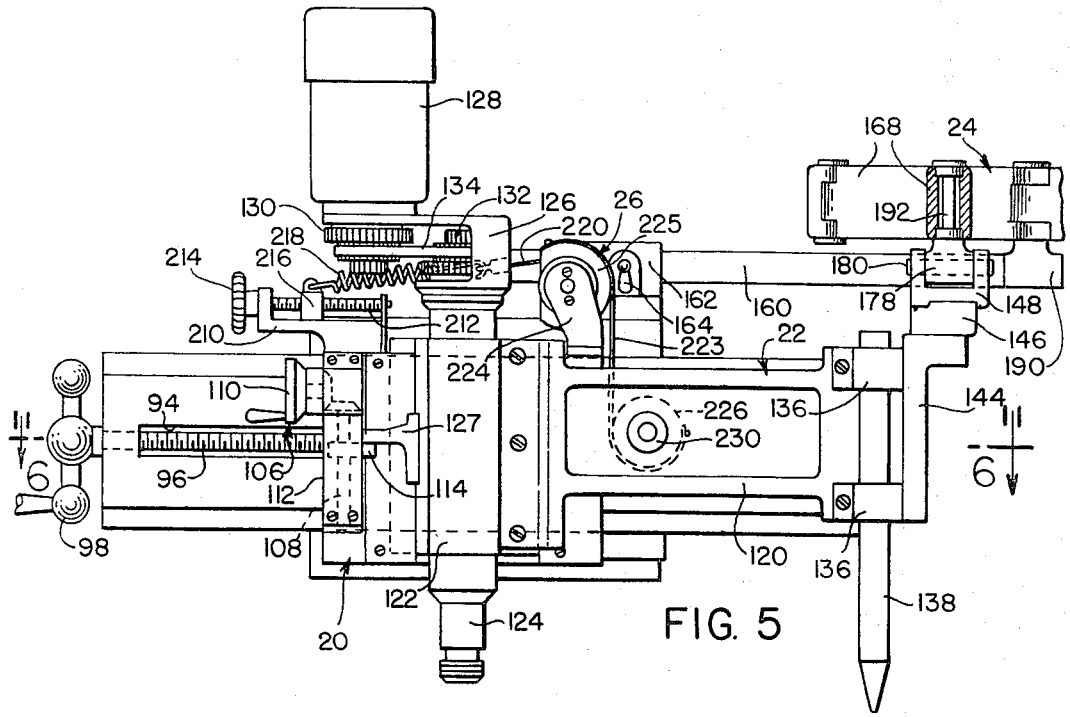
FIGURE 5 is a front elevational view, similar to that in FIGURE 4, showing the same support member adjustably moved to an extreme right position.
Figure 6:
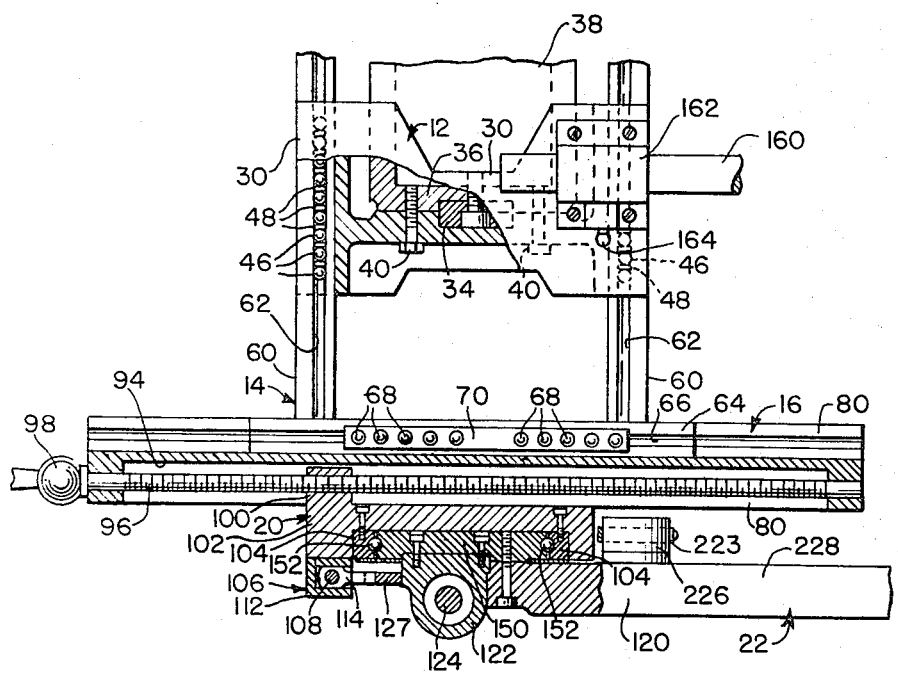
FIGURE 6 is a horizontal sectional view taken substantially on the line 6—6 of FIGURE 5.

The arm structure 22 comprises an arm member 120, a cutting tool spindle body 122 in which a spindle 124 is bearing mounted and rotatably disposed, and upon which a motor drive supporting bracket 126 is integrally provided or, alternatively, fixedly secured to the body 122. In alignment with the stop 114 a projecting member 127 is secured to the body 122 for engaging the stop to limit the downward vertical travel of the arm structure 22. A motor drive 128 is affixed to the bracket and is provided with a pulley 130 disposed in a common plane with a spindle pulley 132, and with a timing-type belt 134 disposed upon and in driving relationship with both pulleys. At the right on arm member 120 are a pair of mounting lugs 136, 136 for securing a tracer pin 138 vertically and in parallel with the spindle 124. The tracer pin can also be mounted on an extension bracket 140 (shown in broken lines in FIGURES 1 and 4) affixed to the lugs 136, 136 for operation when the master model M and the work piece W are disposed out of alignment on the support or table 142. Affixed to the end of the arm member 120 adjacent the tracer pin lugs 136, 136 is a bracket member 144 supporting a slide bar 146 upon which the pantograph beam pivot yoke 148 is adjustably positioned.

The spindle body 122 is secured to a slide 150 designed to travel vertically between balls 152, 152 rolling in ball guides 104, 104 of the slide way structure 20. Thus, the arm structure 22 travels vertically in the slide way structure 20 and is adjustably positioned horizontally on the slide member 80 by screw 96.

The pantograph beam structure 24 is pivotally mounted upon the support plate structure 12 and is pivotally connected to the vertically slidable arm structure 22 at the yoke 148. The structure 24 comprises an adjustably positionable cantilever arm 160, a mounting bracket 162 secured to the support plate member 30 for holding and locking the arm 160 in adjustably extended position by the screw lever 164, a pair of parallel beams 166, 168 and a second pair of parallel beams 170, 172 forming the parallelogram, an extension 174 of the beam 172 at the digital end of which is secured a manual control pin 176, and a pivot bearing and the pivot yoke 148. The beams 166 and 170 are pivotally connected by a pin 182, the beams 166 and 172 by the pin 184, the beams 172 and 168 by a pin 186, and the beams 168 and 170 by the pin 188. The pin 182 is fixedly secured to a bearing 190 rotatably disposed upon the cantilever arm 160 adjacent its digital end. The beam 168 is provided intermediate its ends with a pin 192 fixedly secured to the bearing 178 pivotably mounted upon the pin 180 secured in the yoke 148.

The vertical travel counterbalancing mechanism 26 comprises a mounting bracket 210 secured to the slide body 102, an adjusting screw 212 with manual turn knob 214, a traveling nut 216 securing one end of a coiled spring 218, a metal strap 220 secured to the other end of the spring and attached to a portion of an eccentric cam 221 pivotally mounted on a support bracket 224, a second strap 223 having one end secured to the leading edge of a concentric cam 225 and depending therefrom in a plane to an attachment on a cylindrical anchor 226 held under tension and secured to the rearward face 228 of the arm member 120 by a screw mount 230.

The pantograph device 10 is, as will be noted from the description above, a self-contained unit suitable for attachment to any kind of a machine tool T having a work support or table 142.

The machine 10 is simply installed on the machine tool support member 38 by mounting the support plate member 30 so that the plug 34 is positioned in and between the counterbores of walls 32 and 36, and securing these members together by screws 40. The operator sets up his work block W and model M on the support table 142, firmly securing them to the surface. Depending upon the spacing between the work W and the model M and their relative sizes, as well as the proportions or ratio to be maintained, the cantilever arm 160 is shifted inwardly or extended outwardly of the bracket 162 as the slide body 102 is advanced to the right or left of the slide member 80, so that the tracer 138 is positioned over the model M and the spindle 124 is positioned over the work W in relatively corresponding area relationship. If the model M is large or disproportionate with respect to the work W, an extension bracket 140 can be mounted on the tracer support lugs 136, 136 and the tracer 138 secured in such bracket, as shown.

The balancing mechanism 26 is then adjusted by turning knob 214 so as to apply tension to the spring 218 for lifting the spindle structure, the arm structure 22 and the pantograph beam structure 24 with relative ease, when the operator grasps the manual control pin 176 and elevates the pantograph beam structure. The stop 114 is adjusted by turning the wheel 110 to limit the vertical downward travel of the spindle 124 at any particular time, the stop being adjusted downwardly by the operator at intervals as metal cutting proceeds, in accordance with the usual practice.

Figure 2:
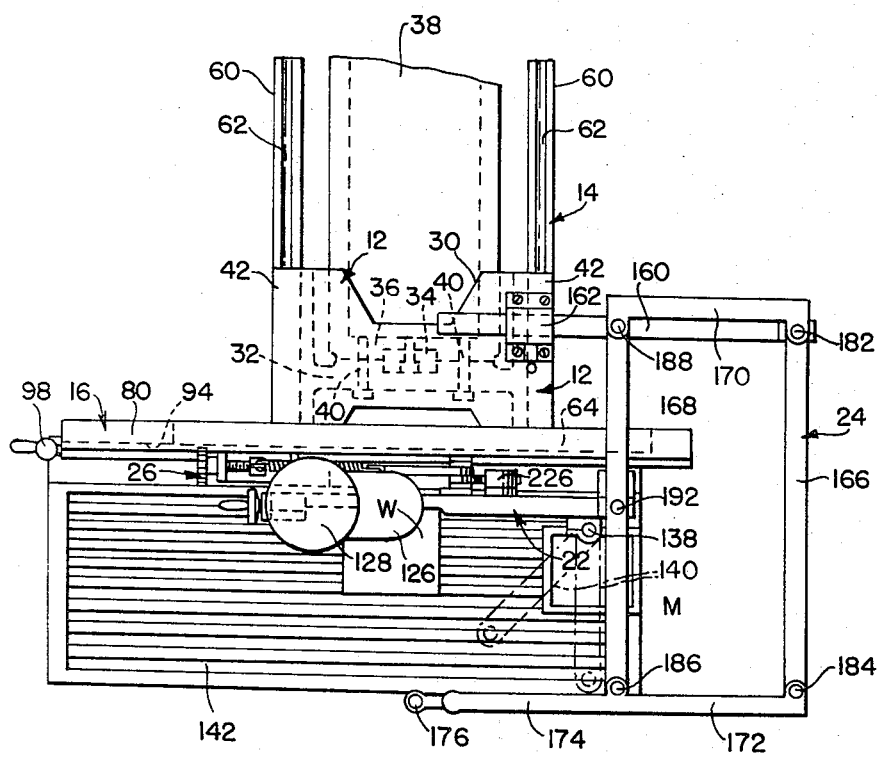
FIGURE 2 is a top plan view taken substantially on the line 2—2 of FIGURE 1.
Figure 3:
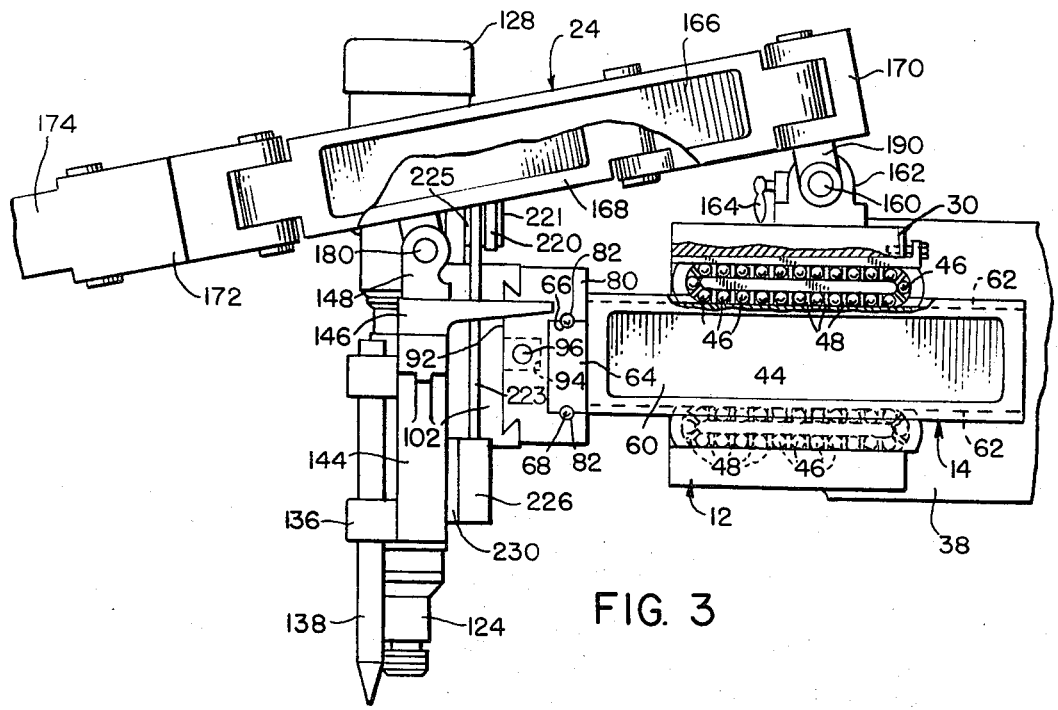
FIGURE 3 is a vertical side elevational view showing the machine of FIGURE 1 moved vertically downward from the position shown in FIGURE 1.

For most usual applications of the machine 10, the slide body 102 is adjustably positioned by turning screw 96 so that the body is substantially central upon the slide member 80. When large work pieces W and large models M are involved, the slide body 102 can be advanced to the right or to the left of the slide member 80 by turning crank 98 and screw 96, table 142 and the set up being left in position. These positions are shown in FIGURES 1 and 2. Thus, the machine 10 can be used to progressively machine portions of a work piece, portion by portion, with relative ease. As one portion of a model contour is reproduced, the cutter spindle 124 and tracer 138 are simply advanced to another area of the model and work by turning screw 96. This expandable feature and characteristic greatly enlarges the utility of the machine.

In operation, the operator controls the cutting action of the tool attached to the spindle 124 by grasping the control pin 176 and the tracer 138 above the model M so that the cutter just touches the work piece W. Then, by adjusting the stop 114 downwardly for a few thousandths of an inch, he passes the tracer over the highest surface of the model M until by progressive downward cutting the tracer touches the model M, and such surface then is progressively reproduced in the work piece. The tracer 138 contacts all areas of the model M because the to-and-fro movement of the arms 60 covers the surface from back to front and the lateral travel of the slide member 80 brings the tracer 138 into contact with such surface from right to left, or vice-versa. As the stop 114 is lowered, the cutting tool reproduces the vertical contour of the surface of model M.

When a hydraulic drive is to be considered and applied to the instant machine 10, it is recommended that such drive be controlled from the manual control pin 176 to which a suitable switch can be connected. Upon actuation of the switch at this point, there is no change in the dimensional relationship of the tracer 138 and the cutting tool spindle 124 and therefore cutting proceeds according to the operative contact of the tracer on the master model M. It is deemed unnecessary to illustrate and describe in detail the installation of such control switch and hydraulic drive for the front slide member 80 and for the to-and-fro arms 60 as the means for and connection of such devices are conventional and well known in the art to which such devices pertain. A hydraulic drive is suitable when a large machine embodying the invention is produced, requiring more than the usual amount of operator strength to normally operate the device efficiently and with relative ease. The hydraulic drive should preferably be designed to operate in two horizontal dimensions only and not provide any vertical travel or drive as such latter movement is more properly and efficiently controlled by the operator as he turns wheel 110 to adjust the limiting stop 114.

It is of course to be understood that the slide member 80 need not be provided with the adjusting screw 96 for advancing the slide body 102 from one position to another on the dovetail tenon 84. In other words, the arm structure 22 can be arranged for vertical travel on a vertical slide 150 in ball guides 104, 104 that are directly secured to the slide member 80 or similar cross-slide member which travels laterally on the front rail member 64. Adjustable movement of the slide body 102 extends the operative perimeter of the cutting tool and tracer, without enlarging the machine, but it is not always essential.

Having described the invention in its simplest terms, it is to be understood that the features of construction may be varied in greater or lesser degree without departing from the essence of the invention defined in the appended claims.

I claim:

1. A machine for three-dimensional machining of a workpiece with respect to a model by pantograph control, comprising
   a support for said workpiece and said model,
   a support for said machine,
   a support plate structure adapted to be secured to said support for said machine,
   arm members slidably mounted in said support plate structure for movement to-and-fro of said workpiece and model support,
   a front rail member disposed transversely of and fixedly conjoining said arm members,
   a cross-slide structure slidably mounted on said front rail member for movement in a direction transversely of said to-and-fro movement of said arm members,
   a slide body movably mounted on said cross-slide structure for movement parallel therewith,
   means for adjustably moving said slide body on said cross-slide structure,
   a spindle and tracer arm structure mounted for vertical slidable movement on said slide body,
   and a pantograph beam structure pivotally mounted on said support plate structure and pivotally connected to said vertically slidable arm structure.

2. The machine structure defined in claim 1, and including
   a counter-balancing mechanism assisting in the vertical travel return of said arm structure from a downward to an upward position,
      said mechanism being mounted upon said slide body and being connected to said arm structure.

3. The machine structure defined in claim 1, wherein said workpiece and model support is adjustably movable with respect to said spindle and tracer arm structure.

4. The machine structure defined in claim 1, wherein said arm members are spaced apart from each other, at each lateral side of said support plate structure.

5. The machine structure defined in claim 1, wherein said cross-slide structure is provided on its front face with a tenon and said slide body is provided on its rear face with a complementary mortise.

6. The machine structure defined in claim 1, wherein said means for adjustably moving said slide body on said cross-slide structure comprises
   screw means mounted for rotation on said cross-slide structure and extending longitudinally of and substantially the length of said cross-slide structure,
   and a nut portion on said slide body threadedly engaged on said screw means.

7. The machine structure defined in claim 1, wherein said spindle and tracer arm structure comprises
   an arm member affixed to a slide vertically slidable in ball guides affixed to said slide body,
   a cutting tool spindle body removably affixed to said arm member, and a tracer secured to said arm member, spaced from said spindle body and parallel with the axis of said spindle body.

8. The machine structure defined in claim 1, wherein said slide body is provided with vertical slide means for said spindle and tracer arm structure,
said spindle and tracer arm structure being vertically slidable in said vertical slide means,
adjustably positioned vertical travel stop means mounted on said slide body for limiting downward vertical travel of said spindle and tracer arm structure,
and manually operable control means associatedly conjoined with said vertical travel stop means and mounted on said slide body for adjustably positioning said stop means.

9. The machine structure defined in claim 1, wherein said pantagraph beam structure comprises
an adjustably positionable cantilever arm, a bracket for said cantilever arm secured to said support plate structure,
parallel beams forming a parallelogram pivotally secured at one of its corners to said cantilever arm and pivotally connected at another point of said parallelogram to said spindle and tracer arm structure,
and an extension on one of said parallel beams for manual control of said pantograph beam structure by an operator,
whereby said spindle and tracer arm structure is manually controlled for movement to-and-fro of said workpiece and said model on said slidably mounted arm members, for lateral movement in a direction transversely of said arm members on said front rail member, and for vertical movement on said slide body.

10. A machine for three-dimensional machining of a workpiece with respect to a model by pantograph control, comprising
a support for said workpiece and said model,
a support for said machnie,
a support plate structure adapted to be secured to said support for said machine,
arm members slidably mounted in said support plate structure for movement to-and-fro of said workpiece and model support,
a front rail member disposed transversely of and fixedly conjoining said arm members,
a cross-slide structure slidably mounted on said front rail member for movement in a direction transversely of said to-and-fro movement of said arm members,
a spindle and tracer arm structure mounted for vertical slidable movement on said cross-slide structure,
and a pantograph beam structure pivotally mounted on said support plate structure and pivotally connected to said vertically slidable arm structure.

11. The structure defined in claim 7, wherein said spindle and tracer arm structure further comprises
power drive means for a cutting tool fixedly secured to said spindle body,
whereby said cutting tool, spindle body and power drive means comprise a vertically movable unitary member.

12. In a machine for three-dimensional machining of a workpiece with respect to a model by pantograph control, the subcombination comprising
a horizontally movable support body member,
an arm structure secured to and arranged for vertical movement on said support body member,
said arm structure comprising
an arm member,
a unitary workpiece machining device adjustably mounted upon said arm member,
and a tracer pin secured to said arm member in spaced relationship to said machining device,
and a pantograph beam structure operatively connected to said arm member for controlling the vertical movement of said arm structure.

13. The structure defined in claim 12, and in which said workpiece machining device comprises
a cutting tool spindle body,
a cutting tool driven spindle rotatably supported by said spindle body,
power drive means supported by said spindle body and operatively connected to said spindle for rotatably driving said spindle,
said power drive means being supported in constant-spaced relationship to said spindle.

14. The structure defined in claim 12, and including
a counterbalancing mechanism operatively secured to said arm member for assisting in the vertical travel movement and return of said arm structure upon said support body member.

References Cited

UNITED STATES PATENTS

| | | | |
|---|---|---|---|
| 2,260,157 | 10/1941 | Zwick | 90—13.1 |
| 2,371,941 | 3/1945 | Zwick | 90—13.1 |
| 2,812,694 | 11/1957 | Reichard et al. | 90—13.1 |

FOREIGN PATENTS 492,119  9/1938  Great Britain.

ANDREW R. JUHASZ, *Primary Examiner.*

GERALD A. DOST, *Assistant Examiner.*

U.S. Cl. X.R.

33—25